(12) United States Patent
Sullivan et al.

(10) Patent No.: US 7,081,439 B2
(45) Date of Patent: Jul. 25, 2006

(54) METHODS FOR CONTROLLING THE FLUID LOSS PROPERTIES OF VISCOELASTIC SURFACTANT BASED FLUIDS

(75) Inventors: Philip Sullivan, Bellaire, TX (US);
Yenny Christanti, Houston, TX (US);
Isabelle Couillet, Cambridge (GB);
Stephen Davies, Sugar Land, TX (US);
Trevor Hughes, Cambridge (GB);
Alexander Wilson, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 282 days.

(21) Appl. No.: 10/707,011

(22) Filed: Nov. 13, 2003

(65) Prior Publication Data

US 2005/0107265 A1 May 19, 2005

(51) Int. Cl.
*C09K 8/00* (2006.01)
(52) U.S. Cl. ............... 507/269; 507/219; 507/271; 507/275
(58) Field of Classification Search .............. None
See application file for complete search history.

(56) References Cited

U.S. PATENT DOCUMENTS

| 4,695,389 | A |   | 9/1987 | Kubala | 252/8.553 |
|---|---|---|---|---|---|
| 4,725,372 | A |   | 2/1988 | Teot | 252/8.514 |
| 4,910,248 | A | * | 3/1990 | Peiffer | 524/535 |
| 5,551,516 | A |   | 9/1996 | Norman | 166/308 |
| 5,929,002 | A |   | 7/1999 | Joyce | 507/211 |
| 5,948,733 | A |   | 9/1999 | Cawiezel | 507/212 |
| 5,964,295 | A |   | 10/1999 | Brown | 166/308 |
| 5,979,557 | A |   | 11/1999 | Card | 166/300 |
| 6,194,356 | B1 | * | 2/2001 | Jones et al. | 507/225 |
| 2002/0169085 | A1 |   | 11/2002 | Miller | 507/200 |
| 2003/0166471 | A1 | * | 9/2003 | Samuel et al. | 507/200 |

FOREIGN PATENT DOCUMENTS

| GB | 2332224 | | 10/1943 |
|---|---|---|---|
| WO | WO 99/50530 | * | 10/1999 |
| WO | 02/11874 | | 2/2002 |
| WO | 02/064945 | | 8/2002 |
| WO | 03/56130 | | 7/2003 |

\* cited by examiner

*Primary Examiner*—Robert Sellers
(74) *Attorney, Agent, or Firm*—David Cate; Tim Curington; Robin Nava

(57) ABSTRACT

Disclosed are methods of treating subterranean formations by first providing a suspension of colloidal particles prior to the injection of viscoelastic based treatment fluid, and injecting the treatment fluid into a well. The colloidal particles reduce fluid loss into the formation. According to a second embodiment, the treating fluid includes a hydrophobically-modified polymer, said hydrophobically-modified polymer being present at a concentration between approximately its overlap concentration c\* and approximately its entanglement concentration $c_e$. The method is particularly useful for fracturing operations in medium to high permeability formations.

22 Claims, 4 Drawing Sheets

METHODS FOR CONTROLLING THE FLUID LOSS PROPERTIES OF VISCOELASTIC SURFACTANT BASED FLUIDS

TECHNICAL FIELD OF THE INVENTION

This invention relates to compositions and methods to reduce fluid loss from viscoelastic surfactant (VES) based fluids during treatment of subterranean formations such as hydraulic fracturing or wellbore cleanout operations.

BACKGROUND OF THE INVENTION

Viscoelastic surfactant fluids are normally made by mixing in appropriate amounts suitable surfactants such as anionic, cationic, nonionic and zwitterionic surfactants in an aqueous medium. The rheology of viscoelastic surfactant fluids, in particular the increase in viscosity of the solution, is attributed to the three dimensional structure formed by the components in the fluids. When the surfactant concentration significantly exceeds a critical level, and eventually subjected to the presence of an electrolyte, the surfactant molecules aggregate and form structures such as micelles that can interact to form a network exhibiting viscoelastic behavior. In the remaining part of this description, the term "micelle" will be used as a generic term for organized interacting species.

Viscoelastic surfactant solutions are usually formed by the addition of certain reagents to concentrated solutions of surfactants, frequently consisting of long-chain quaternary ammonium salts such as cetyltrimethylammonium bromide (CTAB). Common reagents that generate viscoelasticity in the surfactant solutions are salts such as ammonium chloride, potassium chloride, sodium salicylate and sodium isocyanate, and non-ionic organic molecules such as chloroform. The electrolyte content of surfactant solutions is also an important control on their viscoelastic behavior.

There has been considerable interest in using such viscoelastic surfactants in wellbore-service applications. Reference is made for example to U.S. Pat. Nos. 4,695,389, 4,725,372, 5,551,516, 5,964,295, and 5,979,557.

In treatments of subterranean formations, in particular hydraulic fracturing treatments, the total volume of fluid that needs to be pumped for completing the treatment is strongly influenced by the quantity of fluid lost to the surrounding matrix. In conventional fluids including polymers as viscosifying agents, during the initial phase of the treatment, the polymers are filtered at the rock face to form a polymer filter cake that subsequently inhibits further losses. However, VES-base fluids are polymer-free—which in itself is a major advantage since polymers, remaining in the matrix once the treatment is over, are a main source of formation damage—and consequently the fluid loss process is not governed by the filter-cake formation. Indeed, the rate of fluid flow through the rock is governed by a complex mixture of fluid rheology and fluid flow though the rock.

To overcome the tendency of high fluid loss in polymeric and VES-based fluids (in particular in hydraulic fracturing fluids and gravel carrier fluids), various fluid loss control additives have been proposed. Silica, mica, and calcite, alone, in combination, or in combination with starch, are known to reduce fluid loss in polymer-based fracturing fluids, by forming a filter cake on the formation face which is relatively impermeable to water, as described in U.S. Pat. No. 5,948,733. Use of these fluid loss control additives alone in a VES-based fluid, however, has been observed to give only modest decreases in fluid loss as described in U.S. Pat. No. 5,929,002, which is hereby incorporated by reference. The poor performance of these conventional fluid loss additives is typically attributed to the period of high leak-off (spurt) before a filter cake is formed and the formation of a filter cake permeable to the VES-based fluid.

Jones et al., UK Patent No. GB2,332,224, teaches the use of a wellbore service fluid for water control operations comprising a viscoelastic surfactant and very high concentrations of a cross-linkable water-soluble polymer and a cross-linking agent. Inorganic ions or polar organic molecules can be used as crosslinkers. The objective of the Jones patent is to enhance gel strength of the viscoelastic surfactant (VES)-based wellbore service fluid. Jones et al. does not discuss the use of such fluids to minimize fluid loss during drilling, drill-in, completion or stimulation.

Miller et al, in U.S. Patent Application No. 2002-0169085-A1, have found that adding small amounts of a crosslinker (typically in a concentration less than about 15 pounds per thousand gallons) and a crosslinkable polymer, to polymer free fluid results in effective fluid loss control.

Although the above-mentioned references have demonstrated the ability to control fluid loss by adding polymers or particulate solids to the VES fluid, such solutions inherently damage the permeability of the proppant pack at the end of treatment. Solid particulates are also difficult to meter and add on a continuous basis in field operations, and therefore, have received little field acceptance.

In low permeability media (typically less than approximately 2 mD), the viscosity of the treatment fluid and the compressibility of the reservoir fluids control the leak-off of the VES fluid. In medium to high permeability formations, increasing wellbore service fluid viscosity alone may not suffice to reduce fluid loss to practical levels. Although VES-based materials can be used alone, it would often be better to increase fluid loss control properties. Therefore, it would be desirable to have a VES-based treatment fluids comprising solid-free fluid loss control additives which reduce fluid loss, especially spurt, during treatment.

SUMMARY OF THE INVENTION

Inventors have found that the addition of an aqueous suspension of colloidal particles to a base fluid comprising a viscoelastic surfactant contributes to a significant reduction of the fluid loss into the formation.

According to another aspect, the invention also includes a method of treating a subterranean formation including the step of pumping a colloidal suspension of small particles and an aqueous solution comprising a viscoelastic surfactant, the colloidal suspension and the viscoelastic surfactant being able to interact to form structures that effectively bridge and block pore throats. By controlling the amount of fluid lost to the porous medium, the particles not only make the treatment more efficient, but also reduce the amount of surfactant trapped in the rock. With less depth of infiltration and less surfactant trapped in the rock, there is less damage to the reservoir and better production.

In yet another aspect, the present invention includes a method of treating a subterranean formation including the step of pumping a colloidal suspension of small particles and an aqueous solution comprising a viscoelastic surfactant and a hydrophobically-modified polymer, the hydrophobically-modified polymer being present at a concentration between approximately its overlap concentration c* and approximately its entanglement concentration $c_e$, and the colloidal suspension and the viscoelastic surfactant being able to interact to form structures that effectively bridge and block pore throats. In that aspect, the invention is an improvement of the invention known from WO03/056130 that provides wellbore fluids responsive to hydrocarbons and comprising a limited quantity of surfactant and polymer, thereby reducing the costs involved in the use of the fluid.

BRIEF DESCRIPTION OF THE DRAWINGS

The invention will be better understood in the light of the following description of non-limiting and illustrative embodiments, given with reference to the accompanying drawings, in which.

DETAILED DESCRIPTION

Figure 1:
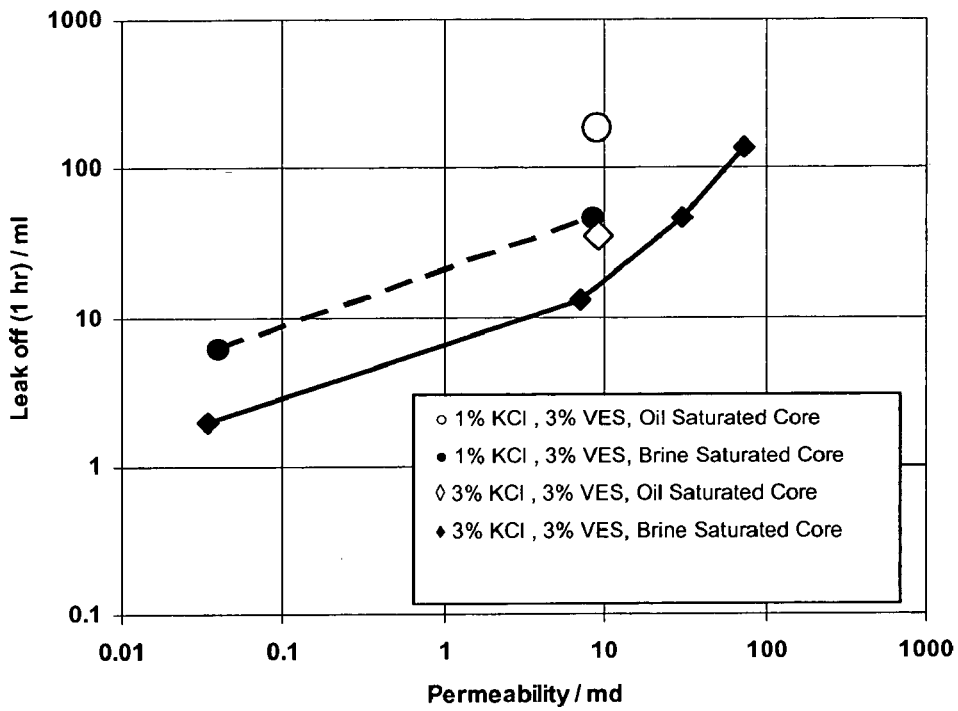
FIG. 1 shows a plot of the total fluid loss after 60 minutes over of range of permeability for viscoelastic fluids without the fluid loss control additive of the invention.

The present invention concerns an aqueous fluid for use in subterranean formation, in particular operations such as drilling, completion, cleaning, fracturing, matrix treatment and gravel packing. The fluids of the invention comprises a viscoelastic surfactant and a colloidal suspension.

Colloidal suspensions are typically dispersions of discrete very small particles, spherical or elongated in shape, charged so that the repulsion between the same charged particles stabilizes the dispersion. Disturbance of the charge balance due for instance to removing the water, changing the pH, or adding salt or water-miscible organic solvent, causes the colloidal particles to aggregate resulting in the formation of a gel.

The particles are less than 1 micron in size, typically in the range from about 10 to about 100 nanometers. The dispersion is prepackaged as a liquid, transparent in the case of relatively low concentration of particles, becoming opalescent or milky at higher concentration. In any case, the dispersion may be handled as a liquid, which greatly simplifies adding the dosage.

Commercial solutions of colloidal particles typically include silica (also known as silica sol) and oxides of aluminum, antimony, tin, cerium, yttrium and zirconium. The particles are mostly spherical with particles sizes usually range from about 8 nm to about 250 nm; but elongated particles, with a length up to 300 nm are also available and were found to be acceptable for the invention. The particles may have a negative or positive charge. To be effective as a fluid loss control agent, the solution of colloidal particles are typically added at a concentration between about 0.1 and 0.5% (ratio of volume of colloidal solution to the total volume).

The surfactant is viscoelastic because, unlike numerous surfactants, which form Newtonian solutions with a viscosity slightly higher than water even at high concentrations, it is capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle.

The viscoelastic surfactant of the invention is usually ionic. It may be cationic, anionic or zwitterionic depending on the charge of its head group. When the surfactant is cationic, it is associated with a negative counterion, which can be an inorganic anion such as a sulfate, a nitrate, a perchlorate or a halide such as Cl—, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na+ or K+. When it is zwitternionic, it is associated with both negative and positive counterions, for example, Cl— and Na+ or K+.

The viscoelastic surfactant may be, for example, of the following formulae: R-Z where R is the hydrophobic tail of the surfactant, which is a fully or partially saturated, linear or branched hydrocarbon chain of at least 18 carbon atoms and z is the head group of the surfactant which can be —NR1R2R3+, —SO3-, —COO or, in the case where the surfactant is zwitterionic, —N (R1)(R2)R3-COO— where R1, R2 and R3 are each independently hydrogen or a fully or partially saturated, linear or branched, aliphatic chain of at least one carbon atom; and where R1 or R2 can comprise a 5 hydroxyl terminal group.

It may be, in another example, a cleavable viscoelastic surfactant of the following formulae, which is disclosed in the International Patent Application WO02/064945: R—X-Y-Z where R is the hydrophobic tail of the surfactant, which is a fully or partially saturated, linear or branched hydrocarbon chain of at least 13 carbon atoms, X is the cleavable or degradable group of the surfactant which is an acetal, amide, ether or ester bond, Y is a spacer group which is constituted by a short saturated or partially saturated hydrocarbon chain of n carbon atoms where n is at least equal to 1, preferably 2 and, when n is 2 3, it may be a straight or branched alkyl chain, and Z is the head group of the surfactant which can be —NR1R2R3+, —SO3-, —COO or, in the case where the surfactant is zwitterionic, —N(R1R2R3-COO—) where R1, R2 and R3 are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A cationic viscoelastic surfactant suitable for the implementation of the invention is the N-erucyl-M,N-bis(2-hydroxyethyl)-N-methyl ammonium chloride. In an aqueous solution comprising 4 wt % NaCl or 3 wt % ACT, this viscoelastic surfactant forms a gel containing worm-like micelles that entangle at concentrations between 1.5 and 4.5 wt %. These worm-like micelles degrade in spherical micelles when the gel is broken by hydrocarbon.

Anionic viscoelastic surfactants suitable for the implementation of the invention are monocarboxylates RCOO— such as oleate where R is C17 or di- or oligomeric carboxylates such as disclosed in the International Patent Application WO 02/11874. These mono-, di- or oligomeric carboxylates form viscoelastic gels when in alkaline solution in the presence of added salts such as potassium chloride (KCl) or sodium chloride (NaCl). Worm-like micelles of said gel degrade to spherical micelles when the gel is broken by hydrocarbon.

Zwitterionic surfactants suitable for the implementation of the invention can be betaine surfactants having the general formula R-M(R1R2)-Z where Z is an alkyl group or R—CN(R1R2R3)-Z where Z is an acyl group. The hydrophobic group R can be aliphatic or aromatic, straight or branched, saturated or unsaturated. The anionic group Z of the surfactant can be —R'—SO3-, —R'—COO where R' is a saturated aliphatic chain. R1, R2 and R3 are each independently hydrogen or an aliphatic chain of at least one carbon atom.

The hydrophobic-modified polymer is soluble in water. It has an average molecular weight comprised between 10,000 and 10,000,000 g/mol and, preferably, between approximately 100,000 and approximately 2,000,000 g/mol. Above 2,000,000 and, definitely, above 10,000,000 g/mol, the polymer may form structures which are difficult to remove from the fracture during the subsequent backflow of formation fluids. Under 100,000 and, definitely, under 10,000 g/mol, the polymer concentration that would be necessary to obtain a fluid of the invention is likely to be too high hence increasing considerably the fluid associated costs.

The hydrophobically-modified polymer has a principal backbone and, grafted on said principal backbone, randomly or not, at a substitution degree range comprised between 0.01 and 10 and, preferentially, between approximately 0.03 and approximately 5 weight percent, pendant hydrophobic chains. The polymer can be charged or non-charged, the charges being positive or negative and being located on the polymer backbone or on the pendant hydrophobic chains. If the hydrophobic substitution degree of the hydrophobically-modified polymer is too high, its solubility in water decreases. If it is too low, it becomes difficult to obtain a stable fluid with a sufficient viscosity. In fact, the substitution degree of the hydrophobically-modified polymer is adjusted with a view to obtain a satisfactory fluid viscosity with sufficient polymer water Volubility.

The principal polymer backbone can be of a biological nature. It can be, notably, a polysaccharide. Suitable polysaccharides for the implementation of the invention are starch or starch derivatives such as starch phosphate, starch succinate, aminoalkyl starch or hydroxypropyl starch; cellulose or cellulose derivatives as carboxymethyl cellulose, methyl cellulose, ethyl cellulose or hydroxypropylmethyl cellulose; chitin or chitin derivatives such as the chitosan or chitosan derivatives such as the N-carboxybutyl chitosan or the N-carboxymethyl chitosan; galactomannans, in particular, guar and guar derivatives as the carboxymethyl guar or the carboxymethyl hydroxypropyl guar derivatives. It can also be a synthetic polymer such as a polyanhydride, for example the poly(isobutylene-alt-maleic anhydride), the poly(ethylene-alt-maleic anhydride), the poly(ethylene-graft-maleic anhydride), a polyacrylamide, a polyacrylate, a polyacrylate/polyacrylamide copolymer, a polyether, a polyester, a polyamide or a polyvinylalcohol.

The pendant hydrophobic chains are preferentially fully or partially saturated linear or branched hydrocarbon chains comprising preferably approximately 12 to 24 carbon atoms and including advantageously a cleavable or degradable group such as an acetal, an amide, an ether, or an ester bond.

An example of a non-charged hydrophobically-modified polymer, which appears convenient for the implementation of the invention, is a guar hydrophobically modified by non charged alkyl chains.

An example of a positively charged hydrophobically-modified polymer, where the charges are located on the polymer backbone, which also appears convenient for the implementation of the invention, is a hydrophobically-modified chitosan. This polymer can be synthesized with various hydrophobic substitution degrees following the route described by Yalpani, M. and Hall, L. D. Macromolecules, 1984, vol. 17, p. 272 which produces N— alkylated chitosan by reductive amination of the free amino groups of the chitosan or, following the route described in D. Plusquellec and al., ENSCR, Departement de Chimie Organique, An Efficient Acylation of Free Glycosylamines for the Synthesis of N-Glycosyl Amino Acids and N-Glycosidic Surfactants for Membranes Studies, J. Carbohydrate Chemistry, 1994, 13(5), 737–751, which, in such case, produces N-acylated chitosan with cleavable hydrophobic chains. Further examples of hydrophobically-modified polymers suitable for the implementation of the invention are hydrophobically modified polyanhydrides, which can be obtained by an amidation or an esterification reaction of a polyanhydride such as a poly(isobutylele-alt-maleic anhydride), a poly(ethylene-alt-maleic anLydride) or a poly(ethylene-graft-maleic anLydride), with, respectively, an amine or an alcohol chain comprising between approximately 12 and approximately 24 carbon atoms.

These hydrophobically-modified polyanhydrides comprise carboxylic groups attached to their backbone, each carboxylic group being associated with one pendant hydrophobic chain. As a result, the hydrophobically-modified polyanhydrides are not only hydrophobic but also hydrophilic. Preferentially, the chemical structure of the pendant hydrophobic chains corresponds to and, more preferentially, matches the hydrophobic tail of the surfactant molecules of the fluid. In such case, the whole chemical structure of the pendant hydrophobic chain and its associated carboxyl group forms an amphiphilic structure corresponding to or matching the surfactant molecule structure, the carboxylic group being analogous to the charged hydrophilic head of the surfactant molecule. The FIG. 13 shows a poly(ethylene-alt-maleic anhydride) hydrophobically modified by oleyl pendant chains and a route for the synthesis of this hydrophobically-modified polymer. As shown on said figure, the hydrophobically-modified poly(ethylene-alt-maleic anhydride) comprises a carboxylic group —COO attached to the carbon atom immediately adjacent to the carbon Advantageously, the viscoelastic surfactant concentration is below 10 wt %, preferentially, below 5 wt % and below $20 \times c^*$ where $c^*$ is the overlap concentration of said viscoelastic surfactant. More preferably, it is comprised between $0.2 c^*$ and $5 \times c^*$. This corresponds to viscoelastic surfactant 20 concentrations far below the viscoelastic surfactant concentration used in viscoelastic surfactant fracturing fluids of the prior art, which are of the order of $30-40 \times c^*$.

The fluid of the invention is hydrocarbon-responsive so that the gel structure breaks down on contact or mixing with hydrocarbons. The long viscoelastic surfactant micelles, which form, together with the hydrophobically-modified polymer, the gel network, degrade on contact with hydrocarbons to form spherical micelles. The hydrophobically-modified polymer concentration, which is under $c_e$, is not sufficient to form an entangled network. Then, the viscosity of the gel decreases to value of about 100 cP or below, preferentially, 20 cP, at a high shear rate.

The fluid of the invention has preferentially a leak-off rate, which is below the leak-off rate of pure viscoelastic surfactant fluids of equivalent rheology. This is a very significant advantage: as a result, the responsive fluid of the invention can be used to fracture higher permeability formations as compared to the pure viscoelastic surfactant fluids. It is likely that, after gel degradation by interaction with hydrocarbons, the polymer component may hinder fracture clean-up relative to the pure viscoelastic surfactant fluid. However, it is also noted that the clean-up performance of the fluid of the invention is likely to be similar or better than that observed for a low concentration linear polymer fracturing fluid, i.e. the clean-up should be acceptable and superior to higher concentration linear polymer fluids or covalently crosslinked polymer fluids.

Practically, all compounds of the fluid of the invention are blended at the surface together with the proppant, which can be, for example, a 20–40 mesh sand, bauxite or glass beads. When subjected to a very high shear rate, the viscosity of this fluid is sufficiently low to allow pumping downhole.

There, the pumped fluid, carrying the proppant, is injected into the formation rocks to be fractured under a high pressure. At that time, the fluid of the invention is sufficiently viscous for carrying the proppant through the fracture. The fluid then degrades by contact with hydrocarbons flowing through the fracture.

EXAMPLES

FIG. 1 presents the result of a comparison of the total fluid loss at 60 minutes (in ml) over a range of permeabilities. The lower curve (full lozenges) was obtained with brine saturated cores and an aqueous solution at 3 wt % potassium chloride and 3 wt % N-erucyl-N,N-bis(2-hydroxyethyl)-N-methyl ammonium chloride. The open lozenge corresponds to a test made with the 3 wt % fluid on an oil saturated core. A strong increase in leak-off is observed where the core permeability is greater than 5 mD.

When lower concentrations of surfactant are used (1 wt %, open and full circles), leak-off greater than 20 ml are observed for formation permeabilities of about 2 mD. At about 10 md permeability, a leak-off of more than 100 ml per hour is achieved with the 1 wt % surfactant solution.

Figure 2:
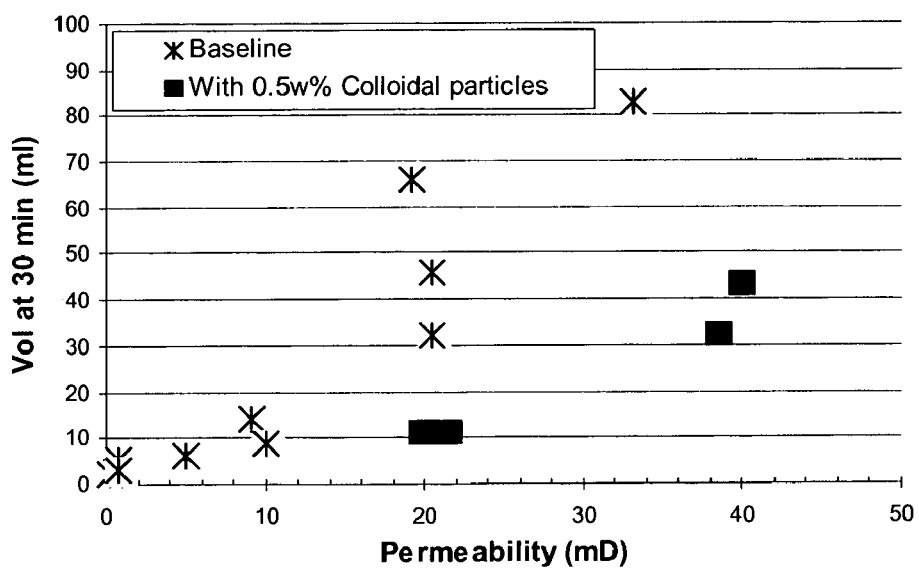
FIG. 2 shows a plot of the total fluid loss after 30 minutes over of range of permeability for another viscoelastic fluid with or without the fluid loss control additive of the invention.

Similar results are obtained with an aqueous solution containing a betaine surfactant that contains an erucic acid amide group (including a $C_{21}H_{41}$ alkene tail group) as shown FIG. 2 where the baseline data compare the leak off (volume in ml at 30 min) depending on the permeability for fluid loss tests through one-inch core for suspensions with 6% betaine at 65° C. Upon the addition of 0.5 w% of Ludox particles, a leak-off with a core having a permeability of 20 mD is equivalent to the one with a permeability of about 10 mD and remains quite acceptable for a core having a permeability as high as about 40 mD. Ludox CL is an alumina-coated silica colloid suspension, from W.R. Grace & Co., Columbia, Md., with surface modified particles approximately 12 nm in diameter.

Figure 3:
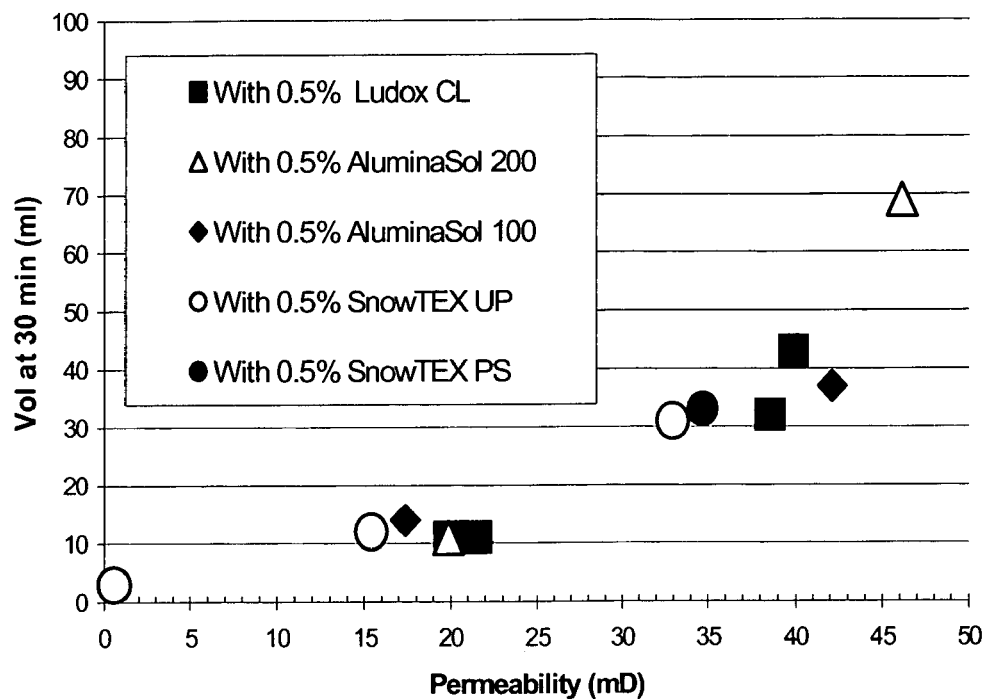
FIG. 3 shows a plot of the total fluid loss after 30 minutes over of range of permeability for a viscoelastic fluid with different types of colloidal particles.

The tests were repeated with other types of colloidal particles as shown FIG. 3. AluminaSol colloids are larger particles with alumina coatings. AluminaSol 100 has a particle diameter of approximately 100 nm and AluminaSol 200 has a particle size of approximately 200 nm. Each of these systems is positively charged by virtue of the alumina coating. The SnowTEX particles used for some of the results in FIG. 1 are uncoated silica particles. In these products, chains of colloidal silica particles are formed to make objects up to 300 nm in length.

Figure 4:
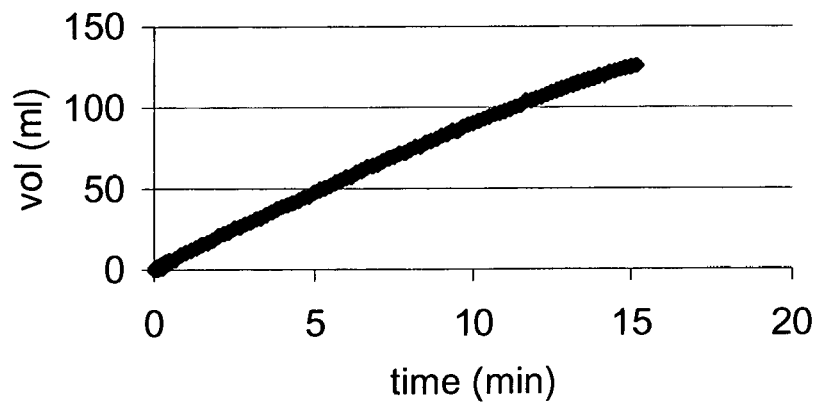
FIG. 4 shows a plot of the total fluid loss after 15 minutes over time for a fluid comprising a linear guar and colloidal particles, in absence of a surfactant.

FIG. 4 shows that the reduction of leak-off is effectively due to an interaction between the surfactant and the colloidal particles. In this test, an aqueous solution comprising 0.36% Linear Guar and 1.0% Ludox CL was tested on a core, without any surfactant in place. The fluid loss is very high (>100 ml at 15 min). Note that this test was run at 22 mD, a condition where the colloid plus VES system works quite effectively.

According to a further embodiment of the present invention, the colloidal suspension is added to an aqueous solution comprising a viscoelastic surfactant and a hydrophobically-modified polymer, the hydrophobically-modified polymer being present at a concentration between approximately its overlap concentration c* and approximately its entanglement concentration $c_e$, and the colloidal suspension and the viscoelastic surfactant being able to interact to form structures that effectively bridge and block pore throats. Two blends were tested.

System 1 is an aqueous fluid comprising 1 wt % of a cationic surfactant N-erucyl-N,N-bis(2-hydroxyethyl)-N-methyl ammonium chloride. 0.2 wt % hydrophobically-modified hydroxypropyl guar and 2 to 4% potassium chloride. The hydrophobically-modified hydroxypropyl guar has a molecular weight around $0.5 \times 10^6$ g/mol and contains between 0.3 and 1.7 wt % of pendant linear hydrocarbon chains of 22 carbon atoms.

System 2 is an aqueous fluid comprising 0.1 wt % of a cationic surfactant N-erucyl-N,N-bis(2-hydroxyethyl)-N-methyl ammonium chloride and 0.3 wt % hydrophobically-modified hydroxypropyl guar and 2 to 4% potassium chloride. The hydrophobically-modified hydroxypropyl guar has a molecular weight around $0.5 \times 10^6$ g/mol and contains between 0.3 and 1.7 wt % of pendant linear hydrocarbon chains of 22 carbon atoms.

Different fluid loss additives according to the present invention were added to the two blends, hence Ludox CL and Ludox HS-40. Ludox HS-40 is a colloidal Silicalsol containing 40 wt % silica. The particle charge is negative and the average particle size is 12 nm.

Figure 5:
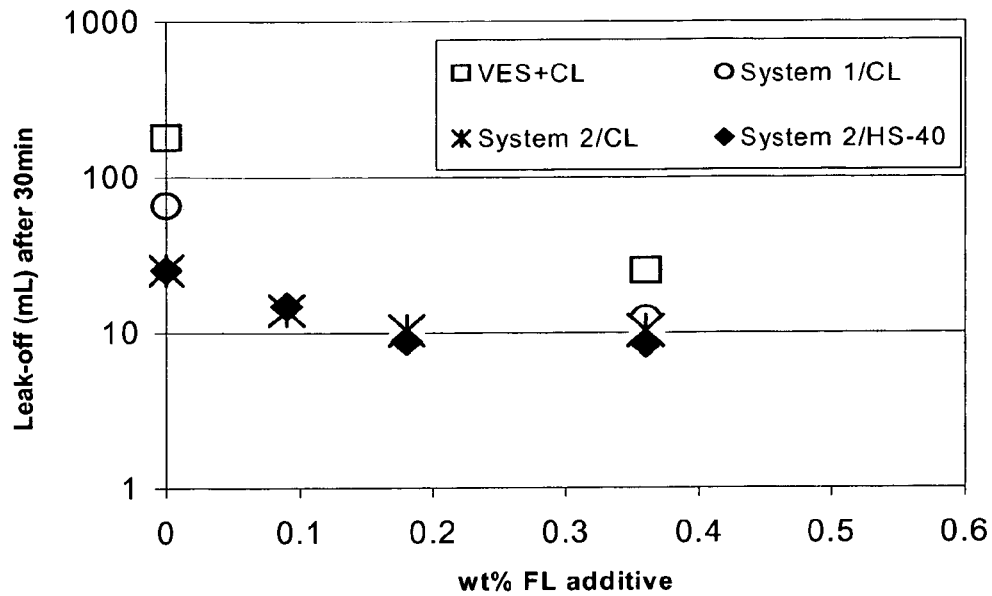
FIG. 5 is a plot of the fluid loss volume—as a function of the fluid loss additive concentration—after 30 minutes of either a pure VES fluid or of blends comprising a VES and a hydrophobically-modified polymer.

On FIG. 5 is plotted the fluid loss volume, as a function of the fluid loss additive concentration, after 30 minutes of either an aqueous fluid comprising 1 wt % of N-erucyl-N, N-bis(2-hydroxyethyl)-N-methyl ammonium chloride (pure VES) and Ludox CL as fluid loss additive, the system 1 with Ludox CL and the system 2 with either Ludox CL or Ludox HS-40 as fluid loss additive. All tests were performed at 60° C., on cores having a permeability within the range 7–13 mD. The core had been saturated with oil prior to the leak-off test at constant differential pressure of 1000 psi (6.89 Mpa). In comparison with the system without a hydrophobically-modified hydroxypropyl guar, a reduced leak-off is obtained with both blends. No difference was found between the two types of Ludox. Best results were obtained with the system 2.

Figure 6:
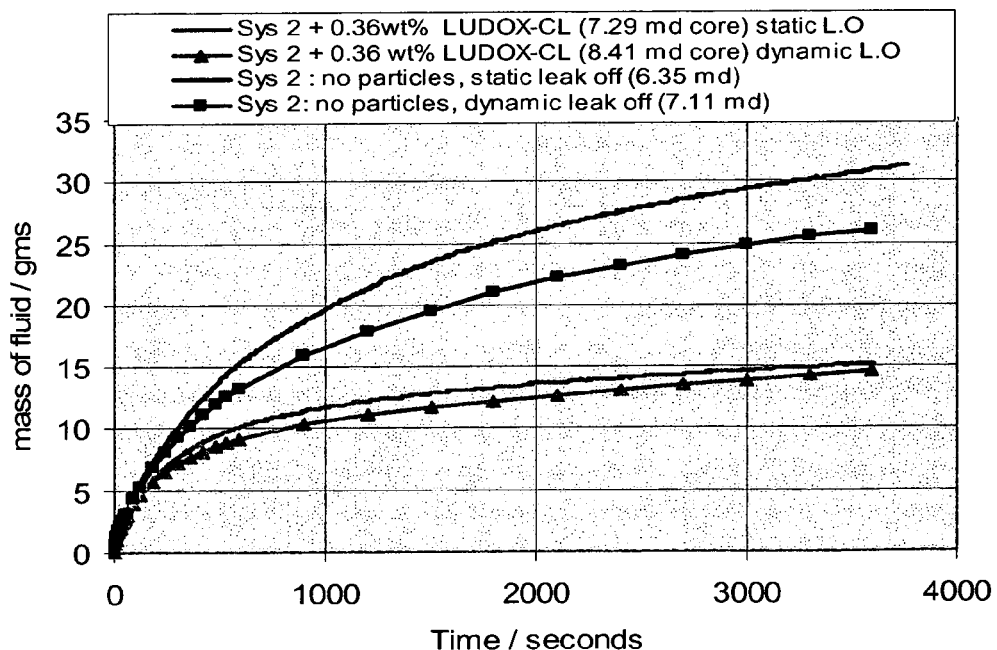
FIG. 6 is a plot of the fluid loss mass—static and dynamic—as a function of time for a blend comprising a VES, a hydrophobically-modified polymer and the fluid loss additive according to the invention.

On FIG. 6 is plotted the fluid loss mass (in grams) as a function of time (in seconds) for the system 2 with or without the addition of 0.36 wt % Ludox CL. The tests were performed on cores having permeabilities ranging between 6.35 mD and 8.41 mD. Both the static and the dynamic leak-off were measured. After about one hour, the leak-off of the systems with colloidal particles according to the invention is about half of the controlled systems.

Figure 7:
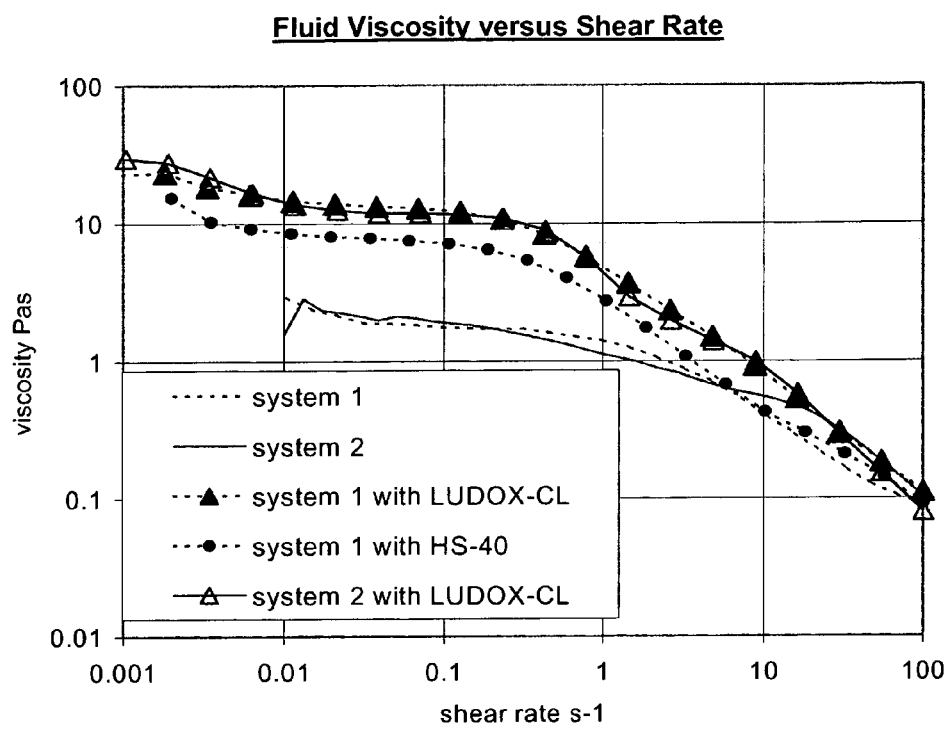
FIG. 7 is a plot of the fluid viscosity as a function of the shear rate for a blend comprising a VES, a hydrophobically-modified polymer, with/without the fluid loss additive according to the invention.

A further advantage of the addition of colloidal particles to blends of viscoelastic surfactants and hydrophobically-modified polymer is an enhancement of the low shear rheology. This is shown FIG. 7 where the fluid viscosity (in Pa.s) is plotted as a function of the shear rates for either system 1 (alone, or with 0.36 wt % of Ludox CL or of Ludox HS-40) or system 2 (alone or with 0.36 wt % of Ludox CL).

The preceding description of specific embodiments of the present invention is not intended to be a complete list of every possible embodiment of the invention. Persons skilled in this field will recognize that modifications can be made to the specific embodiments described here that would be within the scope of the present invention. In particular, though the different embodiments of the present invention were optimized for hydraulic fracturing applications, the invention is also applicable to numerous other oil field applications using surfactant-based complex fluids such as acidizing, gravel packing, coiled tubing cleanup, and other novel chemical treatments.

The invention claimed is:

1. A method of treating a subterranean formation comprising the steps of:
   (a) providing an aqueous suspension of dispersed particles, wherein the dispersed particles consist essentially of colloidal particles comprising a material selected from the group consisting of silica, aluminum oxide, antimony oxide, tin oxide, cerium oxide, yttrium oxide and zirconium oxide, with the proviso that the colloidal particles are not mica;
   (b) injecting down a well an aqueous fluid comprising a thickening amount of a viscoelastic surfactant; and,
   (c) injecting down a well the aqueous suspension of dispersed particles;
   wherein the permeability of said subterranean formation is between about 5 and about 100 md.

2. The method of claim 1, wherein the permeability of said subterranean formation is between about 10 and about 50 md.

3. The method of claim 1, wherein the particles are spherical.

4. The method of claim 3, wherein the particles have a diameter ranging from about 8 nm to about 250 nm.

5. The method of claim 1, wherein the particles are elongated.

6. The method of claim 5, wherein the particles have a length between about 100 and about 300 nm.

7. The method of claim 1, wherein said viscoelastic surfactant is an anionic surfactant.

8. The method of claim 1, wherein said viscoelastic surfactant is a cationic surfactant.

9. The method of claim 1, wherein said viscoelastic surfactant is a zwitterionic surfactant.

10. A method of treating a subterranean formation comprising the steps of:
    (a) providing an aqueous suspension of dispersed particles, wherein the dispersed particles consist essentially of colloidal particles comprising a material selected from the group consisting of silica, aluminum oxide, antimony oxide, tin oxide, cerium oxide, yttrium oxide and zirconium oxide, with the proviso that the colloidal particles are not mica; and
    (b) injecting down a well an aqueous fluid comprising a viscoelastic surfactant and a hydrophobically-modified polymer, said hydrophobically-modified polymer being present at a concentration between approximately its overlap concentration $c^*$ and approximately its entanglement concentration $c_e$; and,
    (c) injecting down a well the aqueous suspension of dispersed particles.

11. The method of claim 10, wherein the permeability of said subterranean formation is between about 5 and about 100 md.

12. The method of claim 11, wherein the permeability of said subterranean formation is between about 10 and about 50 md.

13. The method of claim 10, wherein the particles are spherical.

14. The method of claim 13, wherein the particles have a diameter ranging from about 8 nm to about 250 nm.

15. The method of claim 10, wherein the particles are elongated.

16. The method of claim 15, wherein the particles have a length between about 100 and about 300 nm.

17. The method of claim 10, wherein said viscoelastic surfactant is an anionic surfactant.

18. The method of claim 10, wherein said viscoelastic surfactant is a cationic surfactant.

19. The method of claim 10, wherein said viscoelastic surfactant is a zwitterionic surfactant.

20. The method of claim 1 wherein the colloidal particles are added at a concentration between about 0.1 and 0.5 wt %.

21. The method of claim 10 wherein the colloidal particles are added at a concentration between about 0.1 and 0.5 wt %.

22. The method of claim 1 wherein the dispersed particles consisting essentially of colloidal particles consist of colloidal particles.

* * * * *